(12) United States Patent
Chin et al.

(10) Patent No.: US 6,410,117 B1
(45) Date of Patent: Jun. 25, 2002

(54) REWRITABLE PHASE-CHANGE OPTICAL RECORDING COMPOSITION AND REWRITABLE PHASE-CHANGE OPTICAL DISK

(75) Inventors: Tsung-Shune Chin; Chien-Ming Lee, both of Hsinchu (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/748,986

(22) Filed: Dec. 27, 2000

(30) Foreign Application Priority Data

Aug. 10, 2000 (TW) .......................................... 89116137

(51) Int. Cl.[7] ................................................ B32B 3/02
(52) U.S. Cl. ................ 428/64.1; 428/64.5; 430/270.13
(58) Field of Search ............................... 428/64.1, 64.4, 428/64.5, 913; 430/270.13, 495.1, 945; 369/283, 288

(56) References Cited

U.S. PATENT DOCUMENTS 5,233,599 A   8/1993   Ohno et al. .................. 369/288
5,278,001 A   1/1994   Yamada et al. ............... 430/19
5,294,523 A   3/1994   Nagata et al. ............... 430/495
5,681,632 A   10/1997  Kitaura et al. .............. 428/641
6,335,069 B1 * 1/2002  Ogawa ....................... 428/64.1

FOREIGN PATENT DOCUMENTS

| EP | 0 217 293 A1 | 4/1987 | G11B/7/24 |
| EP | 0 965 984 A1 | 12/1999 | G11B/7/24 |
| JP | 08 321041 | 12/1996 | G11B/7/24 |
| JP | 10 329422 | 12/1998 | B41M/5/26 |

* cited by examiner

*Primary Examiner*—Elizabeth Evans Mulvaney
(74) *Attorney, Agent, or Firm*—Fish & Richardson P.C.

(57) ABSTRACT

The present invention discloses a rewritable phase-change optical disk having a recording material of a five-element alloy, Te—(Ge,Bi,Sb)—X, wherein X is B (boron) or C (carbon); Te (tellurium) ranges from 47 to 60 atomic percentage (at. %); Ge (germanium) ranges from 12 to 48 at. %; and Si (silicon) together with Sb (antimony) range from 5 to 41 at. %, based on the total atomic number of Te, Ge, Bi and Sb; and B or C range from 0.05 to 4 at. %, based on the total atomic number of Te, Ge, Bi, Sb and X.

26 Claims, 14 Drawing Sheets

[Te (Ge$_{1-\alpha}$M$_\alpha$)$_\gamma$]$_{100-a}$X$_a$

M= Bi$_{1-\beta}$Sb$_\beta$, X = B or C $0.67 < \gamma < 1.50$ $0.08 < \alpha < 0.92$ $0.05 < \beta < 0.95$ $0.05 < a < 5$ (Te, Ge, M)

I: (60, 5, 35)

II: (60, 35, 5)

III: (40, 55, 5)

IV: (40, 5, 55)

REWRITABLE PHASE-CHANGE OPTICAL RECORDING COMPOSITION AND REWRITABLE PHASE-CHANGE OPTICAL DISK

FIELD OF THE INVENTION

The present invention is related to an optical information recording medium, and in particular to a rewritable optical recording material, which undergoes a phase change between the crystalline and amorphous states upon irradiation of a signal laser beam, thus enabling recording, erasing, reproduction and over-writing and the rewritable optical disks thereof.

BACKGROUND OF THE INVENTION

An erasable phase-change optical disk utilizes a phase change between the crystalline and amorphous states of a recording layer to accomplish the functions of writing and erasing. The working principles of the erasable phase-change optical disk will be introduced in conjunction with typical prior art references hereinafter for a better understanding of the present invention.

A typical erasable phase-change optical disk is shown in FIG. 1, which comprises a phase-change recording layer 2 interposed between an upper dielectric layer and a lower dielectric layer 3 on a substrate 1, a reflective layer 4 on the upper dielectric layer, and a plastic protection layer 5 on the reflective layer 4. A suitable material for making the dielectric layers 3 is $SiO_2$—ZnS. The substrate 1 may be formed of polymethyl methacrylate, polycarbonate or a glass. Suitable materials for forming the reflective layer 4 include Au, Cu, Al, Ni, Cr, Pt, Pd and an alloy thereof.

The currently used erasable phase-change optical disks utilize a chalcogenide material based on Te or Se as the recording layer. When a region of the recording layer is subjected to a rapid heating to a molten state upon irradiation of a focused laser beam with a high power short pulse modulation, the region will be conductively quenched by the adjacent layers (e.g. the dielectric layers and reflective layer) to an amorphous state, so that a recording mark is formed. The amorphous recording mark has a reflectance lower than that of the blank crystalline region (for some special alloys the reflectance of amorphous recording mark is higher), and the difference in reflectance is used for reproduction of signals. A medium power and long pulse laser beam is used to erase the recording mark, which resumes the blank crystalline region by heating to a temperature between its melting point and crystallization point.

The chalcogenide material was first used as the phase-change recording layer by S. R. Ovsinsky, et al. in U.S. Pat. No. 3,530,441, wherein thin films of $Te_{85}Ge_{15}$ and $Te_{81}Ge_{15}S_2Sb_2$ produce a reversible phase-transition according to irradiation with high energy density light such as the laser beam. Thereafter, most of the research works have concentrated on the chalcogenide materials, for examples GeTe, InSe, InSeTl, InSeTlCo, GeSbTe, GeTeSn, GeTeAs, GeTeSnAu, InTe, InSeTe, InSbTe, and SbSeTe, etc. all pertain to the chalcogenide material. Among them, the series of GeSbTe alloys developed by Matsushita Electric Industrial Co., Ltd., Japan, in U.S. Pat. Nos. 5,233,599; 5,278,011; and 5,294,523 are the most promising ones. The details of these patents are hereby incorporated by reference in their entirety.

However, the aforesaid phase-change materials have a common drawback, which is the existence of two crystalline phases during the crystallization thereof, i.e. the low temperature FCC (face-centered cubic) phase and the high temperature HCP (hexaganol close-packed lattice) phase. A phase transition between the FCC and HCP significantly reduces reliability of the rewritable phase-change optical disk after a long period of use, and decreases the feasible number of writing-erasing cycles.

SUMMARY OF THE INVENTION

The present invention discloses a novel series of five-element alloys, Te—(Ge,Bi,Sb)—X, X=B or C, for use as a phase-change optical recording material that shows improvements over those of the prior art. Typical improvements of the five-element alloys of the present invention comprise an excellent high crystallization rate, and a high optical contrast between the amorphous and crystalline states within the visible light range, and thus is very suitable for use as a rewritable phase-change optical recording material.

A rewritable phase-change optical recording composition designed according to the present invention is to replace part of Ge in the Te—Ge binary system with Bi and Sb simultaneously, and further dope small atom boron or carbon, which has the following formula:

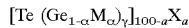

wherein $M=Bi_{1-\beta}Sb_\beta$, X=B or C, or more explicitly, expressed in atomic percentage (at. %):

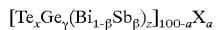

wherein x=47~60 at. %; y=12~48 at. %; z=5~41 at. %, x+y+z=100 at. %; β=0.1~0.9; and a=0.05~4 at. %.

The rewritable phase-change optical recording compositions of the present invention may be classified into two groups according to the value of y, wherein the first group compositions have y=28~48 at. %, z=5~25 at. %, β=0.1~0.9, and a=0.5~3 at. %; and the second group compositions have y=12~28 at. %, z=12~41 at. %, β=0.1~0.9, and a=0.5~3 at. %.

Preferably, the first group compositions have an optical contrast between the amorphous and crystalline states greater than 30% within a visible light range.

Preferably, the first group compositions have a crystallization temperature ranging from 180 to 210° C.

Preferably, the first group compositions only have the face-centered cubic (FCC) phase in its crystalline state and at a temperature below 300° C.

Preferably, the first group compositions have a crystallization activation energy ranging from 1.5 to 3.5 eV at the crystallization temperature.

Preferably, the second group compositions have an optical contrast between the amorphous and crystalline states greater than 20% within a visible light range.

Preferably, the second group compositions have a crystallization temperature ranging from 140 to 180° C.

Preferably, the second group compositions only have the face-centered cubic (FCC) phase at a temperature below 250° C.

Preferably, the second group compositions have a crystallization activation energy ranging from 1.5 to 3.5 eV at the crystallization temperature.

Preferably, the first group compositions have the following compositions: $(Te_{50.6}Ge_{37.4}Bi_{5.7}Sb_{6.3})_{99.11}B_{0.89}$, $(Te_{50.6}Ge_{37.4}Bi_{5.7}Sb_{6.3})_{98.46}B_{1.54}$, $(Te_{50.6}Ge_{37.4}Bi_{5.7}Sb_{6.3})_{98.14}B_{1.86}$ or $(Te_{50.6}Ge_{37.4}Bi_{5.7}Sb_{6.3})_{99.01}C_{0.99}$.

Preferably, the second group compositions have the following composition: $(Te_{54.5}Ge_{22.0}Bi_{6.5}Sb_{17.0})_{99.26}B_{0.74}$, $(Te_{54.5}Ge_{22.0}Bi_{6.5}Sb_{17.0})_{98.73}B_{1.27}$, $(Te_{54.5}Ge_{22.0}Bi_{6.5}Sb_{17.0})_{98.15}B_{1.85}$ or $(Te_{54.5}Ge_{22.0}Bi_{6.5}Sb_{17.0})_{98.93}C_{1.07}$.

The present invention also provides a rewritable phase-change optical disk comprising a substrate; a rewritable phase-change optical recording layer deposited on said substrate, wherein said rewritable phase-change optical recording layer has a composition of said rewritable phase-change optical recording composition of the present invention.

DETAILED DESCRIPTION OF THE INVENTION (1) Alloy Design

Figure 1:
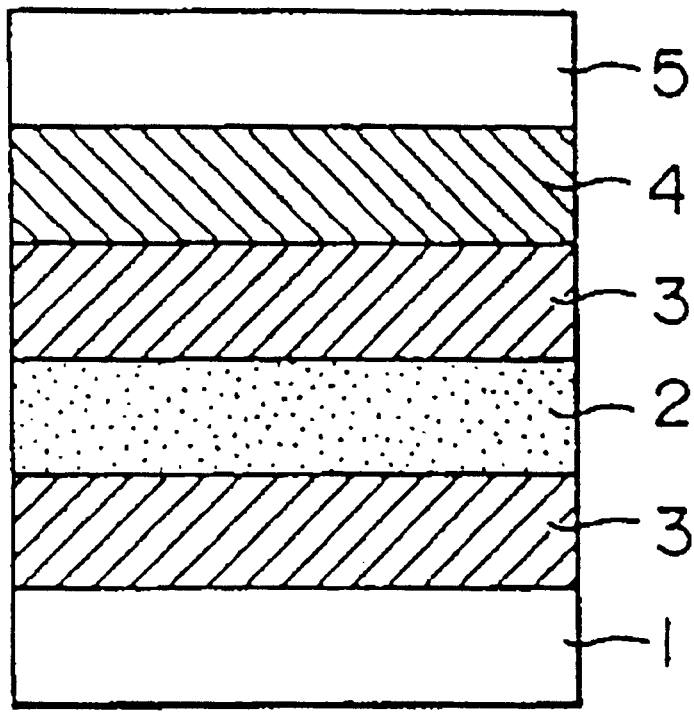
FIG. 1 is a sectional view showing a structure of a conventional erasable phase-change optical disk.
Figure 2:
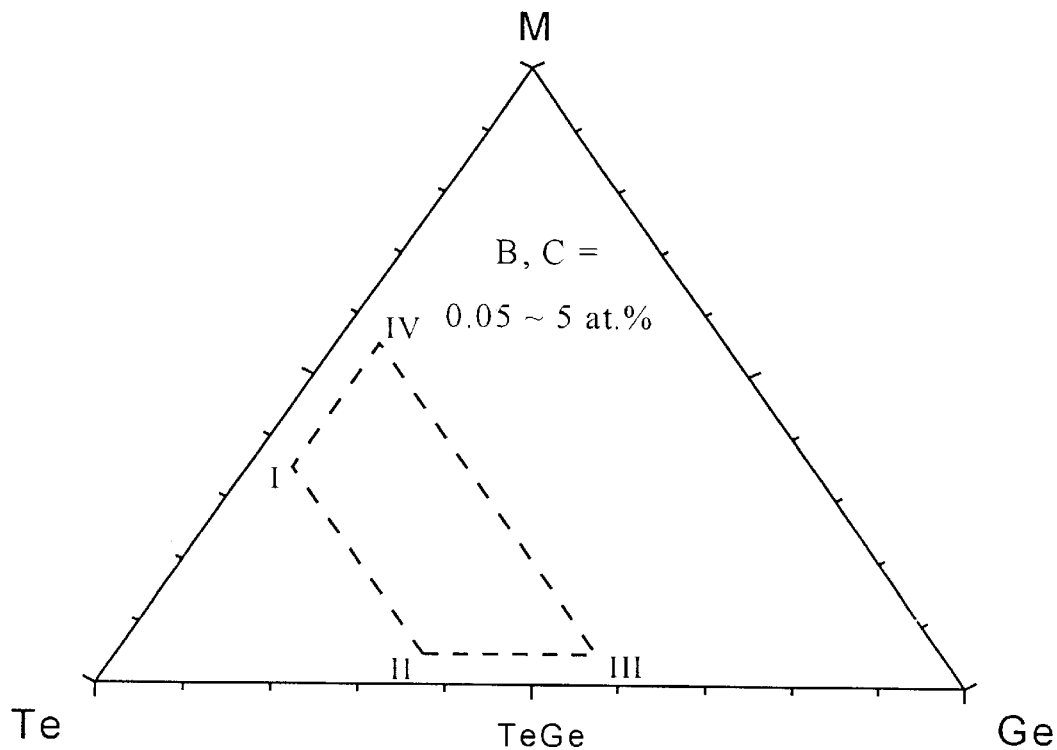
FIG. 2 is a composition diagram showing a broader scope of the rewritable phase-change optical information recording composition according to the present invention, Te—(Ge,Bi,Sb)—X, wherein X=B or C, and X has 0.05~5 at. %.

The designing of the alloys of the present invention is based on the binary alloy, TeGe. TeGe has disadvantages such as a high melting point (725° C.), a high crystallization temperature, a high crystallization activation energy barrier, and the existence of a second crystalline phase (HCP) at high temperature. In order to adjust the crystallization temperature and crystallization activation energy, the present inventors use VA group elements to partially replace the expensive and high-melting-point Ge in the TeGe alloy. More specifically, Bi and Sb are added to lower the crystallization temperature and crystallization activation energy, and to facilitate the preparation of the designed alloys. On the other hand, smaller atoms of IIIA or IVA, such as boron or carbon, are introduced with a minor quantity into the interstitial sites of lattice to stabilize the crystalline phase of the designed alloy layer at high temperature, and thus maintain a single crystalline phase at high temperature. The designed alloy of the present invention has a composition of $Te(Ge,Bi,Sb)_\gamma$, wherein $\gamma$ is better between 0.67 to 1.50 to retain the FCC crystalline phase. The amount of B or C added is limited within a range of 0.05 to 5 at. % to avoid precipitation of B, C or their compounds. Finally, the ratio of Ge:Bi:Sb are varied. The designed alloys of the present invention have the composition range encompassed by points I, II, III and IV shown in FIG. 2, and can be represented by the following formula:

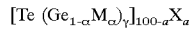

$[Te\ (Ge_{1-\alpha}M_\alpha)_\gamma]_{100-a}X_a$ wherein $M=Bi_{1-\beta}Sb_\beta$; X=B or C; $0.67<\gamma<1.50$; $0.08<\alpha<0.92$; $0.05<\beta<0.95$; and $0.05<a<5$. The above formula can be more explicitly expressed in atomic percentage (at. %) as

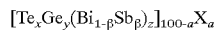

$[Te_xGe_y(Bi_{1-\beta}Sb_\beta)_z]_{100-a}X_a$ wherein x=47~60 at. %; y=12~48 at. %; z=5~41 at. %, x+y+z=100 at. %.

(2) Preparation of the Designed Alloys and Target

Any methods known in the prior art can be used in preparing the designed alloys, and a target for forming a layer of the designed alloys of the present invention. The following examples are illustrative only, and not limitative of the remainder of the disclosure in any way whatsoever. Te—(Ge,Bi,Sb) alloy ingot or target was prepared by sealing high purity Te, Ge, Bi and Sb in a predetermined weight ratio within a quartz tube, melting the elements by heating to 800~1000° C. while rotating and shaking the quartz tube, maintaining said heating temperature for one hour in the case of a small diameter quartz tube or for three hours for a larger quartz tube, and cooling the quartz tube.

The ingot obtained after cooling was heated again to a temperature 20° C. below the melting point of the alloy ingot for one week to carry out a homogenization heat treatment. The melting point of the alloy ingot was determined in advance by DSC analysis. The composition of homogenized alloy ingot was analyzed before using as a target having a thickness of about 5 mm.

The addition of boron or carbon was carried out by adding high-purity boron or carbon while melting the Te—(Ge,Bi, Sb) alloy ingot, or by melting GeB or GeC and the Te—(Ge,Bi,Sb) alloy ingot together. Alternatively, a composite target for depositing a layer of the five-element alloy, Te—(Ge,Bi,Sb)—X, wherein X=B or C, was prepared by attaching a piece of high purity boron or carbon to a surface of the Te—(Ge,Bi,Sb) target in a predetermined area ratio.

(3) Deposition of Layer

Any deposition methods known in the prior art can be used to form the recording layer of the optical disk of the present invention, which include (but not limited to) evaporation methods in vacuum such as thermal evaporation and E-beam evaporation; sputtering methods such as DC, RF, magnetron, symmetric, and non-symmetric sputtering, etc.; and vacuum ion plating.

In Examples 1 and 2 of the present invention the recording layers of the phase-change optical disks, Te—(Ge,Bi,Sb)—X, wherein X=B or C, were formed by RF magnetron sputtering with the composite target and without heating the substrate. The control example used a target of $Te(Ge_{0.8}Sb_{0.2})$ Example 1 used a composite target formed by attaching boron or carbon thin pieces of different sizes on the surface of $Te(Ge_{0.8}Bi_{0.1}Sb_{0.1})$ target, and Example 2 used $Te(Ge_{0.5}Bi_{0.125}Sb_{0.375})_{0.8}$ as the main target. Two different substrates were used, one was glass (Dow Corning #7059 glass) and the other was polycarbonate (PC). The recording layer was deposited directly on the substrate to 100 nm thickness.

The as deposited layers were amorphous, and a crystallization annealing heat treatment was conducted to convert it to a crystalline state in the following examples. The samples were heated in a furnace at a predetermined temperature in the range from 180–350° C. for 10 minutes. The flowing argon atmosphere at pressure about 1 atm was maintained in the furnace.

(4) Analysis

The analyses were conducted for both the as deposited layers and the crystallization-annealed layers.

An inductively coupled plasma-atomic emission spectrometer (ICP-ES) was used to quantitatively determine the composition of the deposited layer; a low angle X-ray diffractometer was used to analyze the structure of the deposited layers; and a photospectrometer was used to measure the reflectance (R) of the of the deposited layers. A differential scanning calorimeter (DSC) was used to conduct thermal analysis of the as deposited layers after they were stripped off from the substrates, wherein the crystallization temperatures of the amorphous layers were determined. Their crystallization activation energies were calculated from the shift of the exothermic peaks in the DSC curves resulting from different heating rates by the method of Kissinger's plot.

(5) Analysis Results

The compositions of the deposited layers in Examples 1 and 2 determined by ICP-AES quantitative analysis together with that of the control example are shown in Table 1.

TABLE 1

| Designed composition | Measured composition | Designation |
|---|---|---|
| Control: $TeGe_{0.8}Sb_{0.2}$ | $Te_{51.4}Ge_{36.1}Sb_{12.5}$ | A |
| Example 1: | $Te_{50.6}Ge_{37.4}Bi_{5.7}Sb_{6.3}$ | B0 |
| $[Te(Ge_{0.8}Bi_{0.1}Sb_{0.1})]_{1-a}B_a$ | $(Te_{50.6}Ge_{37.4}Bi_{5.7}Sb_{6.3})_{99.11}B_{0.89}$ | B1 |
| | $(Te_{50.6}Ge_{37.4}Bi_{5.7}Sb_{6.3})_{98.46}B_{1.54}$ | B2 |
| | $(Te_{50.6}Ge_{37.4}Bi_{5.7}Sb_{6.3})_{98.14}B_{1.86}$ | B3 |

TABLE 1-continued

| Designed composition | Measured composition | Designation |
|---|---|---|
| $[Te(Ge_{0.8}Bi_{0.1}Sb_{0.1})]_{1-a}C_a$ | $(Te_{50.6}Ge_{37.4}Bi_{5.7}Sb_{6.3})_{99.01}C_{0.99}$ | B4 |
| Example 2: | $Te_{54.5}Ge_{22.0}Bi_{6.5}Sb_{17.0}$ | C0 |
| $[Te(Ge_{0.5}Bi_{0.125}Sb_{0.375})]_{1-a0.8}B_a$ | $(Te_{54.5}Ge_{22.0}Bi_{6.5}Sb_{17.0})_{99.26}B_{0.74}$ | C1 |
| | $(Te_{54.5}Ge_{22.0}Bi_{6.5}Sb_{17.0})_{98.73}B_{1.27}$ | C2 |
| | $(Te_{54.5}Ge_{22.0}Bi_{6.5}Sb_{17.0})_{98.15}B_{1.85}$ | C3 |
| $[Te(Ge_{0.5}Bi_{0.125}Sb_{0.375})_{0.8}]_{1-a}C_a$ | $(Te_{54.5}Ge_{22.0}Bi_{6.5}Sb_{17.0})_{98.93}C_{1.07}$ | C4 |

Figure 3:
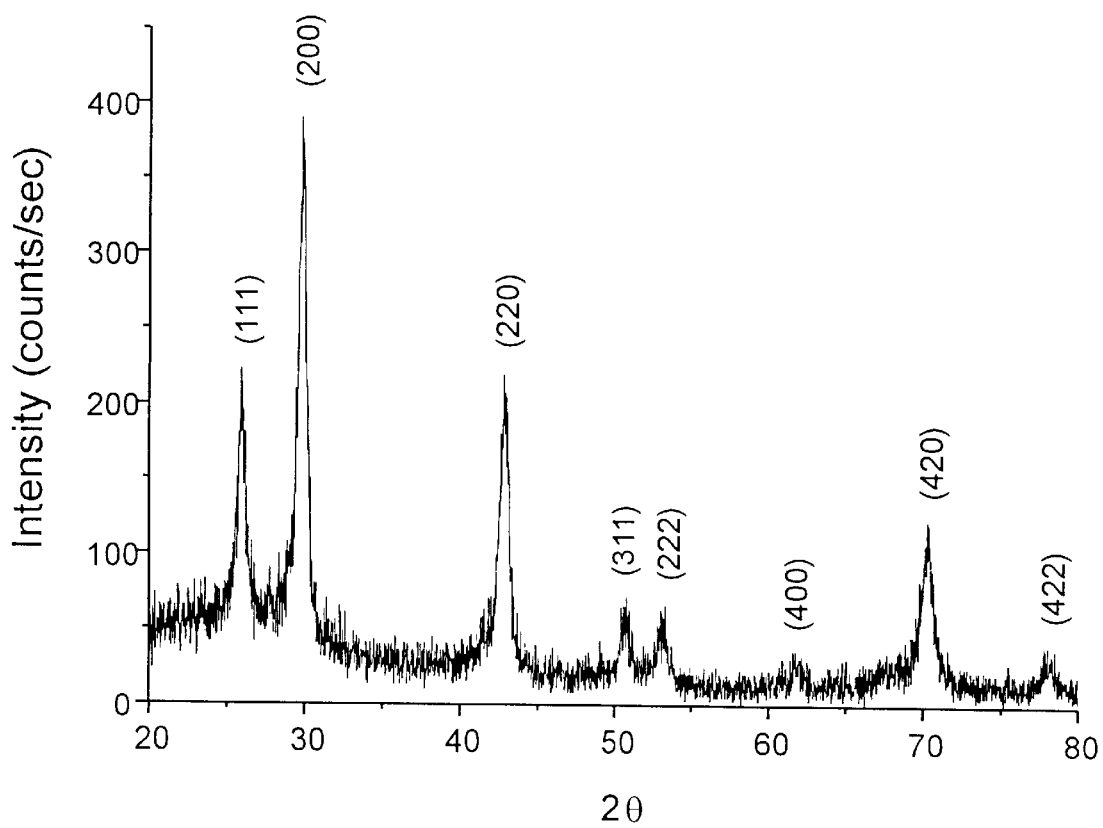
FIG. 3 shows an X-ray diffraction spectrum of a crystalline layer of the control composition, $Te(Ge_{0.8}Sb_{0.2})$, after annealing.

The as deposited layer of the control example was in amorphous state, which was converted to crystalline state after annealing at 250° C. for 10 min as shown in FIG. 3. The crystalline structure was identified as a single phase of face-centered cubic (fcc) structure having a lattice constant of 0.5980 nm.

Figure 4:
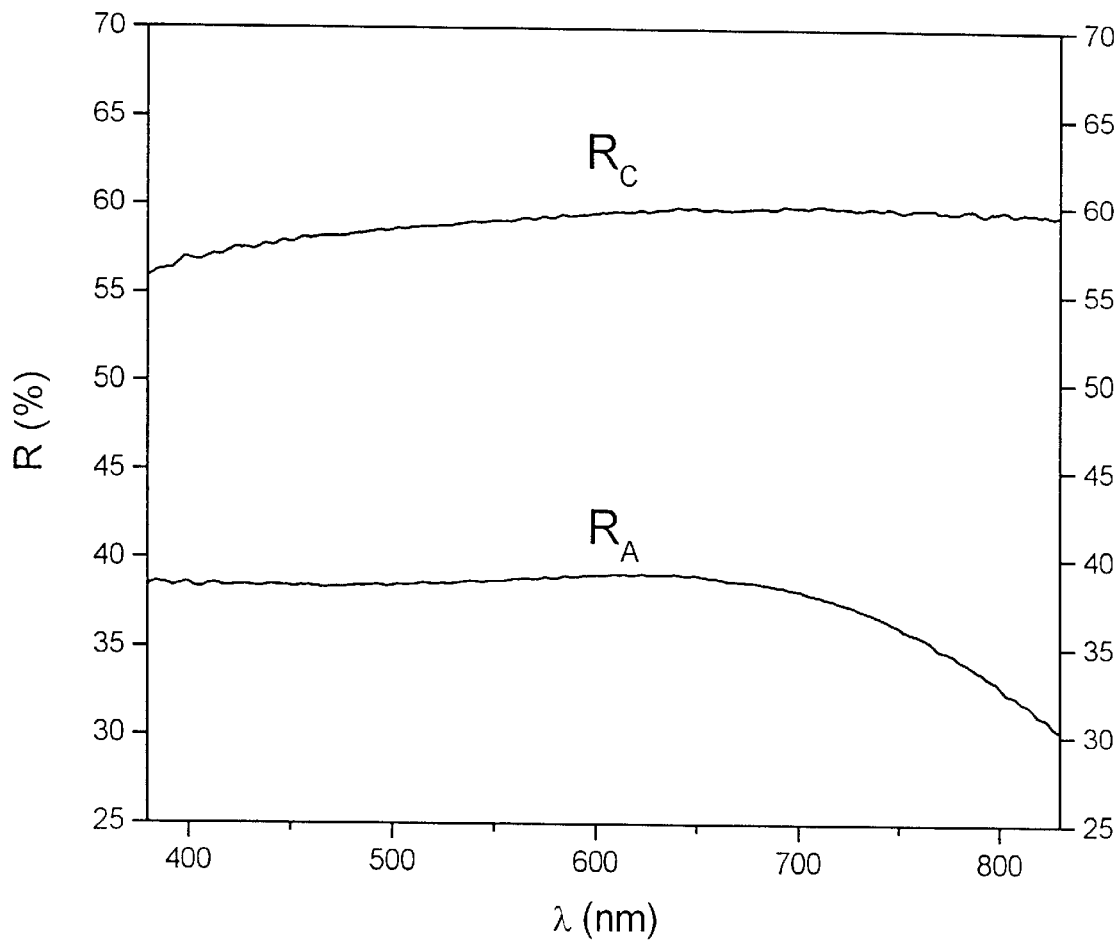
FIG. 4 is a plot of reflectance versus wavelength, within the visible light range, showing the reflectance of the amorphous layer ($R_A$) and the crystalline layer ($R_C$) of the control composition, $Te_{51.4}Ge_{36.1}Sb_{12.5}$.

FIG. 4 shows the reflectance of the amorphous layer ($R_A$) and the crystalline layer ($R_C$) of the control example within the visible light range (380–830 nm). Reflectance at both amorphous and crystalline states has high value, $R_A$ ranges from 39% at 380 nm to 30% at 830 nm, while $R_C$ is about 55–59% within the measured wavelength range.

The deposited layer of the control example was analyzed by Differential Scanning Calorimeter at a heating rate of 10° C./min. One exothermic peak was found at 227° C., i.e. the crystallization temperature. The crystallization activation energy was calculated to be 4.03 eV.

Figure 5:
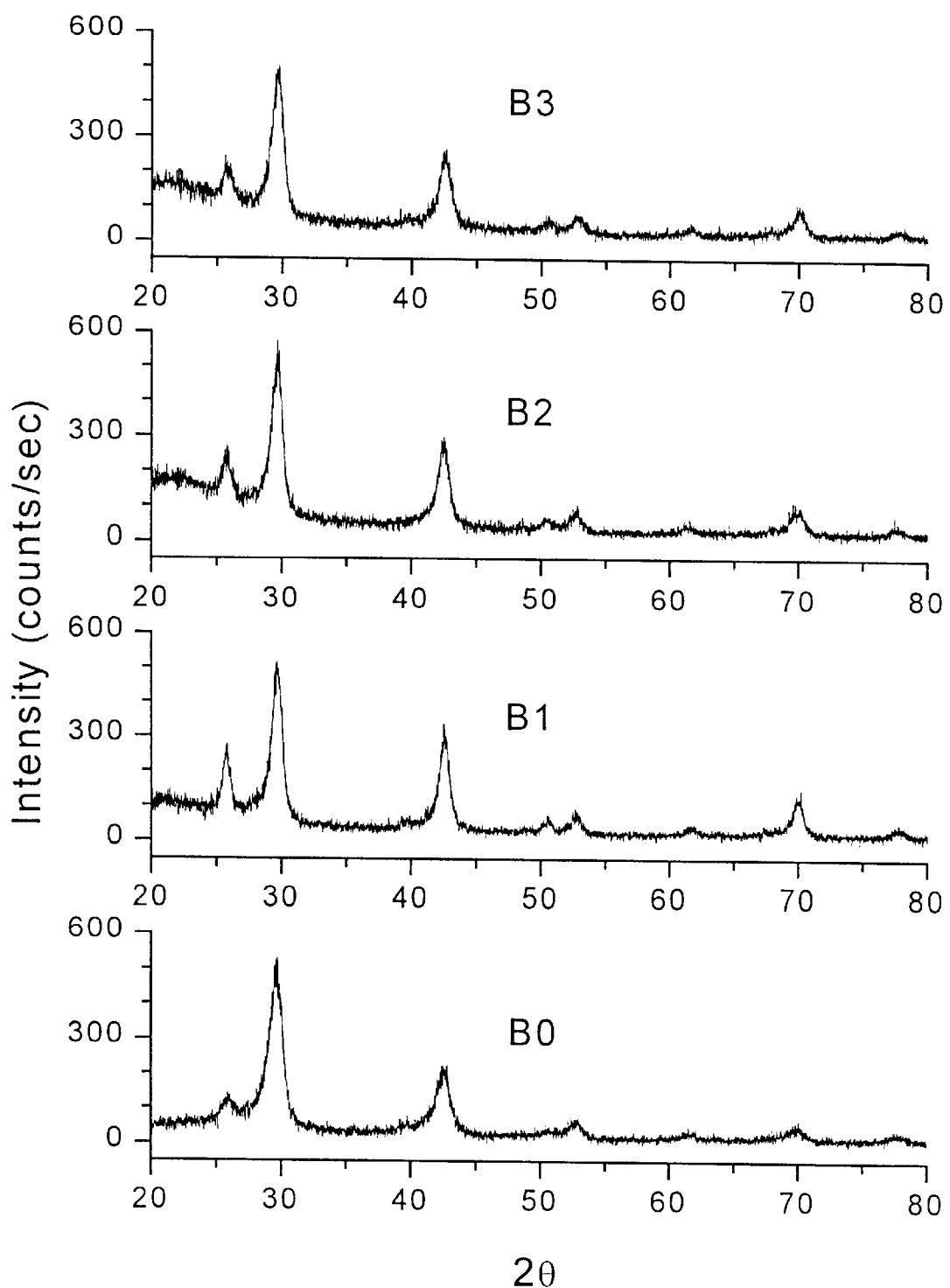
FIG. 5 shows X-ray diffraction spectra of crystalline layers of the four compositions prepared in Example 1 of the present invention, after annealing at 250° C. for 10 minutes, wherein said four compositions have a formula of $(Te_{50.6}Ge_{37.4}Bi_{5.7}Sb_{6.3})_{1-a}B_a$, wherein a=0, 0.89, 1.54 and 1.86 at % designated as B0, B1, B2 and B3, respectively.

The as deposited layers of Example 1 compositions were all at amorphous state, which were subsequently converted to crystalline state after annealing at 250° C. for 10 min as shown in FIG. 5. The crystalline structures of Example 1 compositions were identified as a single phase of face-centered cubic (fcc) structure, wherein the lattice constant thereof increases as the content of boron increases. Similar phenomena were observed in the crystalline layer containing carbon atoms, indicating that boron or carbon atoms enter the interstitial sites of the matrix lattice so as to increase the lattice constant.

Figure 6:
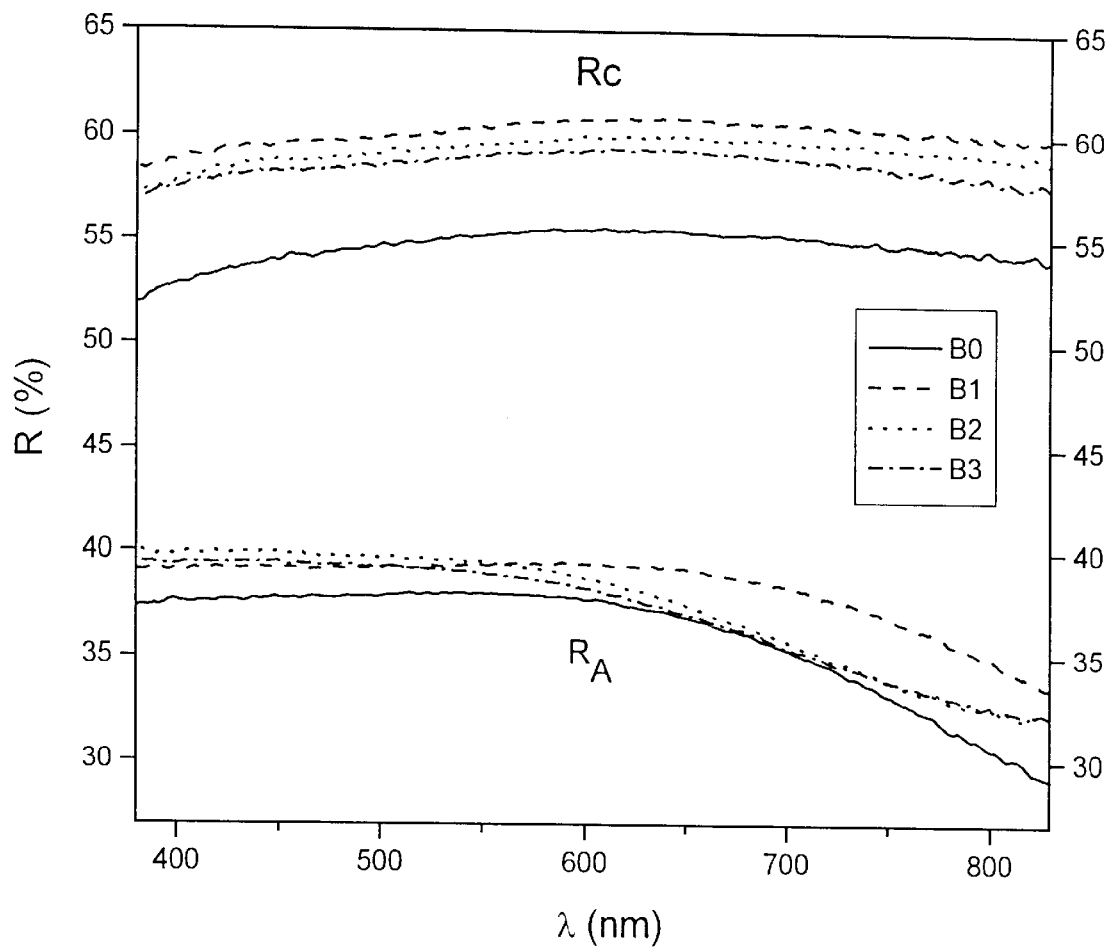
FIG. 6 is a plot of reflectance versus wavelength, within the visible light range, showing the reflectance of the amorphous layer ($R_A$) and the crystalline layer ($R_C$) of the four compositions prepared in Example 1 of the present invention.

FIG. 6 shows the reflectance of the amorphous layer ($R_A$) and the crystalline layer ($R_C$) of the B0 –B3 compositions in Example 1 within the visible light range. It can be seen from FIG. 6 that the reflectance of the crystalline layer, $R_C$, increases significantly as born atoms are added; however, the increase of the reflectance of the amorphous layer, $R_A$, is not so significant. Among them the B1 composition has the greatest change in reflectance. The reflectance of the amorphous layer and the crystalline layer of the B4 composition containing carbon atoms is also higher than that of the B0 composition containing no carbon atom.

Figure 7:
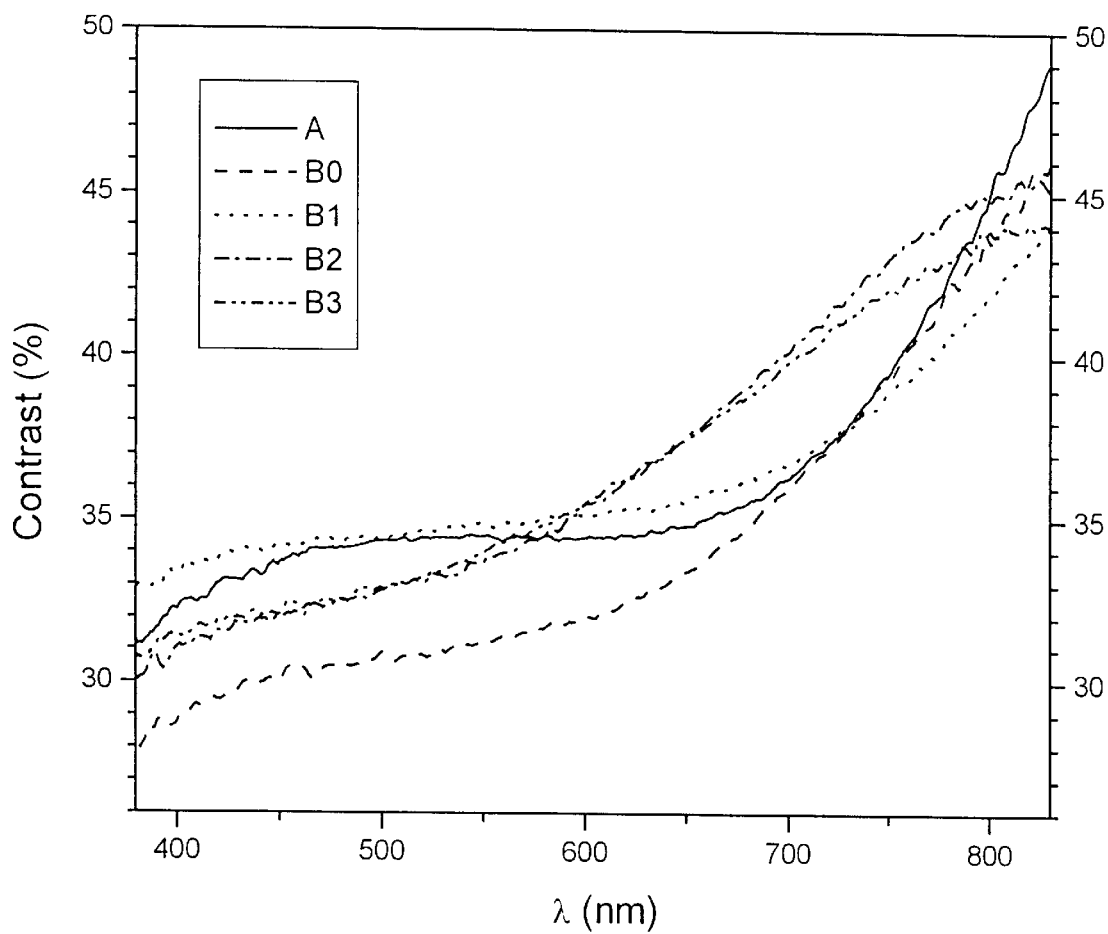
FIG. 7 is a plot of optical contrast versus wavelength, within the visible light range, showing the optical contrasts of the control composition (designated as A) used in FIG. 4 and the four compositions prepared in Example 1 of the present invention.

FIG. 7 is an optical contrast versus wavelength plot showing the optical contrasts of the control example (designated as A in Table 1) and the four compositions in Example 1 (B0 to B3, Table 1) within the visible light range. The optical contrast is defined as follows:

$$\text{optical contrast} = (R_C - R_A)/R_C = \Delta R/R_C$$

The optical contrast has a close relationship with the reading feasibility of the phase-change optical disk. A higher optical contrast means a greater difference in reflectivity between amorphous and crystalline states, and thus a higher carrier-to-noise ratio (CNR) is obtained when the recording mark size is reduced. The control composition (A) has a relatively high optical contrast, e.g. from 31% at 380 nm to 49% at 830 nm. The optical contrast of the B0 composition is about 3–4% lower than that of the control composition (A) through the same wavelength range, indicating that the addition of Bi will lower the optical contrast. However, the compositions of B1 to B4 all have a higher optical contrast compared to the B0 composition, showing that the optical contrast is raised in the bismuth added compositions. Table 2 lists the optical contrasts of the control composition (A), and B0–B4 compositions at selected wavelengths of 780 nm, 650 nm, 450 nm and 380 nm, wherein the optical contrasts of the five-element compositions B1 to B4 are more than 30%.

TABLE 2

| | Wavelength | | | |
|---|---|---|---|---|
| Designation | 380 nm | 450 nm | 650 nm | 780 nm |
| A | 31 | 34 | 35 | 43 |
| B0 | 28 | 30 | 33 | 42 |
| B1 | 33 | 34 | 36 | 41 |
| B2 | 30 | 32 | 38 | 44 |
| B3 | 30 | 32 | 37 | 43 |
| B4 | 32 | 32 | 35 | 39 |

The exothermic peaks in DSC curves of the as-deposited layers of the control composition (A) and B0 to B3 compositions in Example 1 were taken as the crystallization temperatures of the compositions. Table 3 lists the crystallization temperatures and crystallization activation energies of the control composition (A) and B0 to B4 compositions in Example 1. The crystallization temperature and crystallization activation energy are lowered, when Bi is incorporated to the control composition, and further decrease of both was observed with minor doping of B in the case of B1 composition. Such effect was also observed when minor carbon was doped, indicating that the addition of carbon atoms is also effective in lowering the crystallization temperature and crystallization activation energy. It is known that the lower the crystallization activation energy is, the faster the crystallization rate is.

TABLE 3

| Designation | Crystallization temperature (° C.) | Crystallization activation energy (eV) |
|---|---|---|
| A | 227 | 4.03 |
| B0 | 202 | 2.70 |
| B1 | 187 | 1.83 |
| B2 | 193 | 2.69 |
| B3 | 198 | 2.72 |
| B4 | 189 | 2.01 |

In view of the above analysis results of the control example and Example 1, it can be concluded that the addition of both Bi and Sb to the TeGe alloy can effectively lower its crystallization temperature and crystallization activation energy with a sacrifice of low optical contrast. However, further incorporation of boron or carbon atoms thereto can make up the loss of the optical contrast while maintaining the good crystallization characteristics.

Figure 8A:
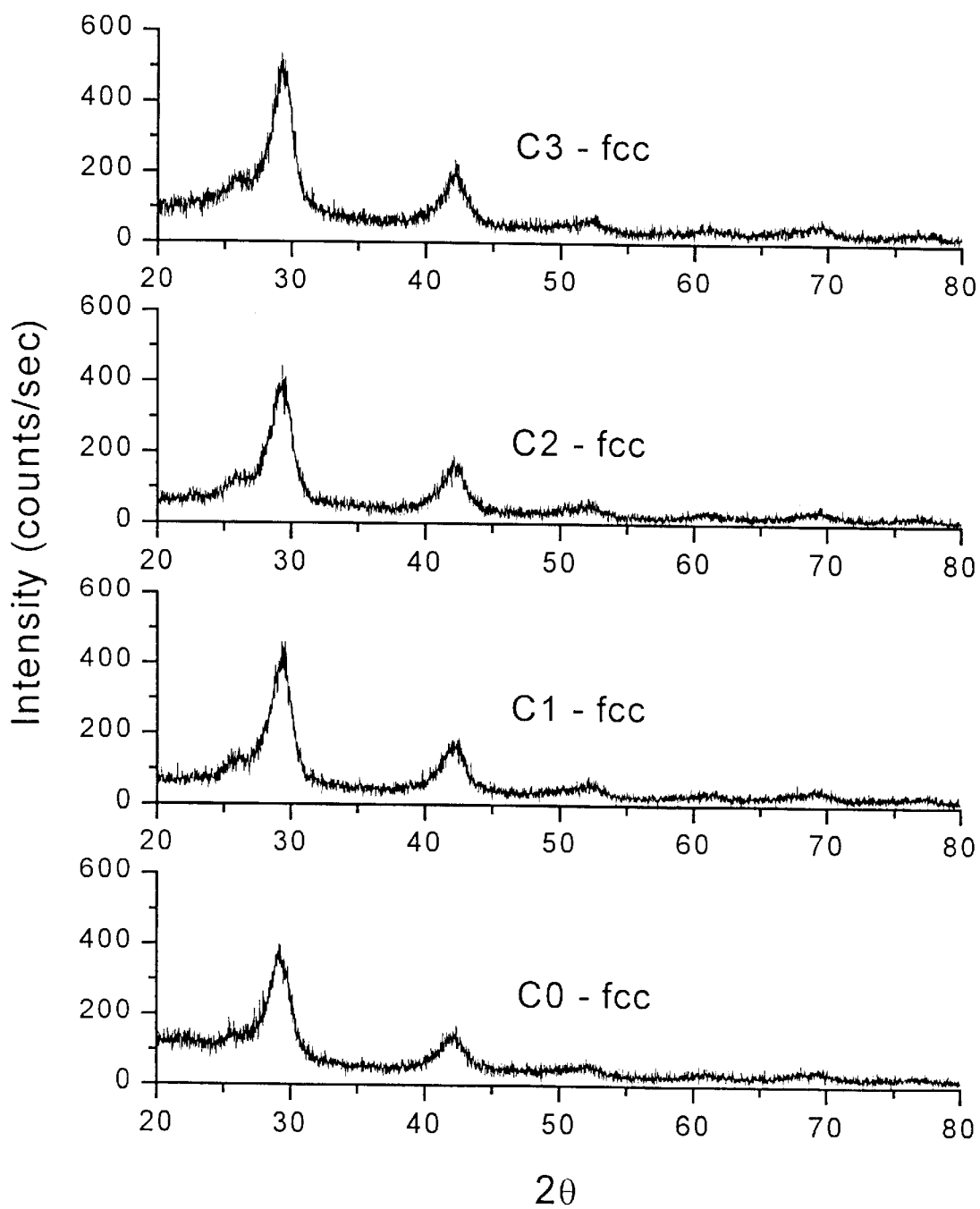
FIG. 8a shows X-ray diffraction spectra of crystalline layers of the four compositions prepared in Example 2 of the present invention, after annealing at 180° C. for 10 minutes, wherein said four compositions have a formula of $(Te_{54.5}Ge_{22.0}Bi_{6.5}Sb17.0)_{1-a}B_a$, wherein a=0, 0.74, 1.27 and 1.85 at % designated as C0, C1, C2 and C3, respectively.
Figure 8B:
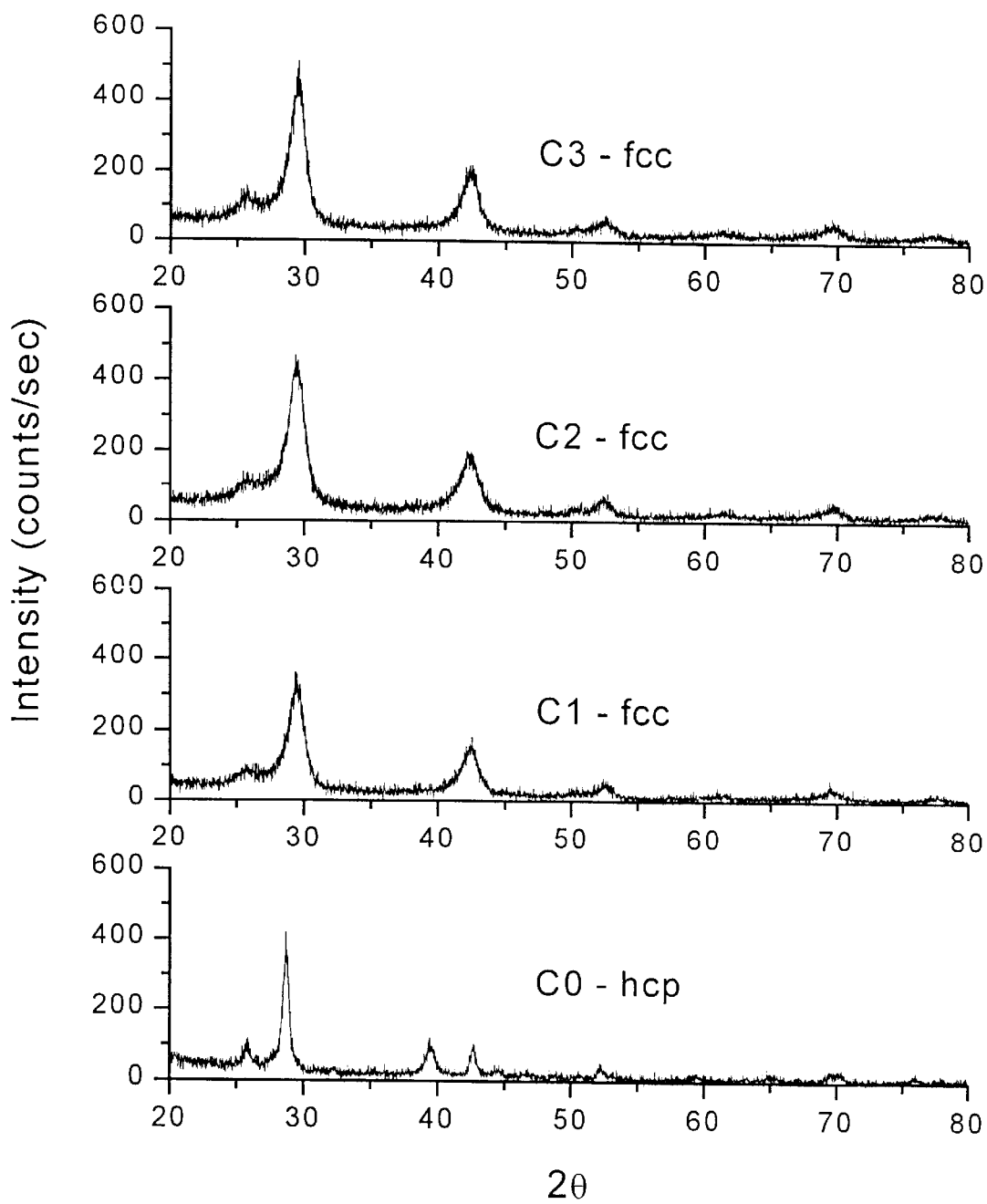
FIG. 8b shows X-ray diffraction spectra of crystalline layers of the four compositions prepared in Example 2 of the present invention, after annealing at 300° C. for 10 minutes.

The as deposited layers of Example 2 compositions were in amorphous state and converted to crystalline state after annealing at 180° C. for 10 min as shown in FIG. 8a. The crystalline structures of Example 2 compositions were identified as a single phase of face-centered cubic (FCC) structure, wherein the lattice constant thereof increases as the boron content increases, indicating that boron atoms enter the matrix lattice in the manner of interstitial atoms so as to increase the lattice constant. When the annealing temperature was raised to 300° C., the crystalline structure of C0 composition changed to a single phase of HCP structure; however, the crystalline structure of C1 to C3 composition layers remained FCC structure. Therefore, the addition of boron atoms has an effect of stabilizing the FCC structure. Moreover, the widths of the diffraction peaks of C1 to C3 composition layers subjected to 300° C. annealing have no significant changes compared to those subjected to 180° C. annealing, as shown in FIGS. 8a and 8b. In the case of C0 composition layer, the width becomes significantly narrower. A greater width of diffraction peak means a smaller grain size in the crystalline layer, so that a noise value due to optical anisotropy is reduced upon reading the optical disk, and boundaries of recording regions are rendered more clear. As a result, the addition of boron atoms can inhibit the growth of crystal grains, thus reducing the grain size. Similar phenomena were observed in the crystalline layer containing carbon atoms (C4 composition), where the crystalline structure was a single phase of FCC structure after being subjected to 180° C. annealing and 300° C. annealing.

Figure 9:
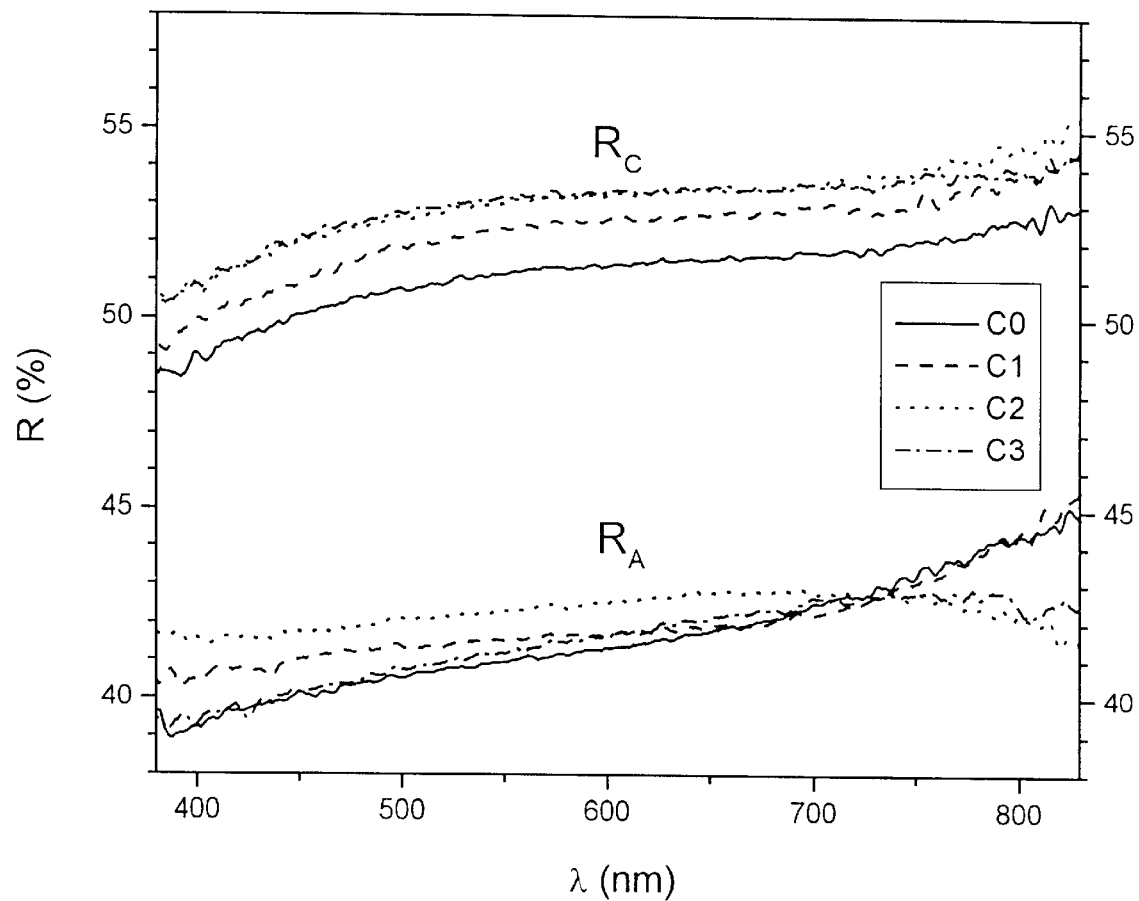
FIG. 9 is a plot of reflectance versus wavelength, within the visible light range, showing the reflectance of the amorphous layer ($R_A$) and the crystalline layer ($R_C$) of the four compositions prepared in Example 2 of the present invention.
Figure 10:
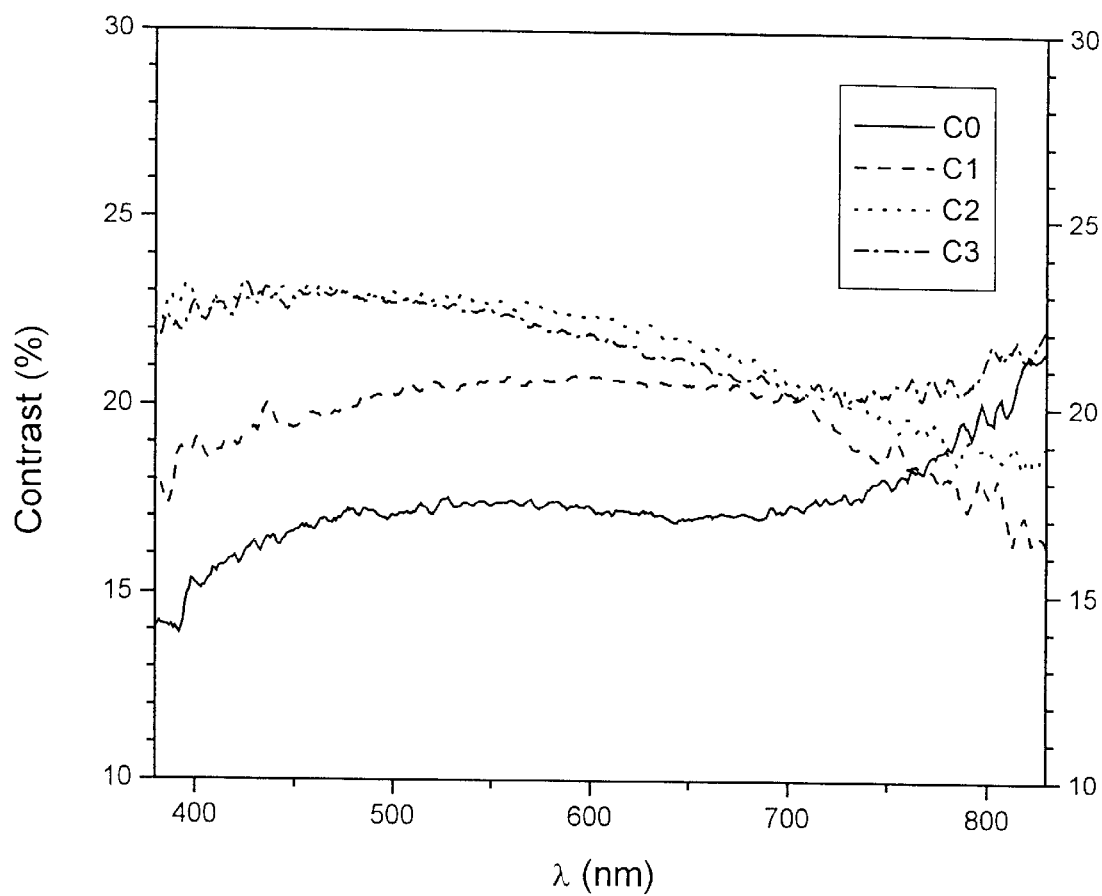
FIG. 10 is an optical contrast versus wavelength plot showing the optical contrasts of the four compositions prepared in Example 2 of the present invention within the visible light range.

FIG. 9 shows the reflectance of the amorphous layer ($R_A$) and the crystalline layer ($R_C$) of the C0–C3 compositions in Example 2 within the visible light range. The reflectance of the crystalline layer, $R_C$, and the reflectance of the amorphous layer, $R_A$, increase in most regions within the visible light range as born atoms are added. FIG. 10 shows the optical contrasts of the four compositions in Example 2 (C0 to C3, Table 1) within the visible light range, which are much lower than those of Example 1. Taking the C0 composition as an example, the average optical contrast within 400 nm–800 nm is 17%, and even lower at wavelength <400 nm. However, the five-element compositions (C1–C3) have an average optical contrast within the visible light range higher than 20%, and will be more higher within the short wavelength region as the boron content increases, for example C2 composition has an optical contrast of 23% at 450 nm. As to the carbon containing layer (C4 composition), the average optical contrast within 400 nm–800 nm is 19%. This indicates that the addition of boron or carbon atoms to the C0 composition can effectively enhance the optical contrast as well as the stability of the crystalline phase. Table 4 lists the optical contrasts of C0–C4 compositions at wavelengths of 780 nm, 650 nm, 450 nm and 380 nm.

TABLE 4

| | Wavelength | | | |
|---|---|---|---|---|
| Designation | 380 nm | 450 nm | 650 nm | 780 nm |
| C0 | 14 | 17 | 17 | 19 |
| C1 | 18 | 19 | 21 | 18 |
| C2 | 22 | 23 | 22 | 19 |
| C3 | 22 | 23 | 21 | 21 |
| C4 | 17 | 19 | 20 | 18 |

The as-deposited layers of the C0 to C3 compositions in Example 2 exhibit two exothermic peaks in their DSC curves. The first exothermic peaks appearing at temperatures about 160° C. are taken as the crystallization temperatures of the compositions, as a result of the change from amorphous state to FCC structure. The second exothermic peaks are caused by the crystalline phase transition from FCC to HCP, which occur at temperatures near 280° C. The addition of boron can lower the crystallization temperature about 1–2° C., while increase the FCC-to-HCP transition temperature (about 270–300° C.). The crystallization activation energies of C0 to C3 compositions corresponding to the amorphousto-FCC transformation remain steady from 2.9 to 3.0 eV as the boron content increases, while the activation energy of FCC-to-HCP transition increases. Therefore, the addition of boron has an effect of stabilizing the FCC structure. The addition of carbon atoms is also effective in stabilizing the FCC structure. Table 5 lists the results of the thermal analysis.

TABLE 5

| Designation | Crystallization temperature (° C.) | Crystallization activation energy (eV) | Phase-change temperature from FCC to HCP (° C.) | Phase-change activation energy from FCC to HCP (eV) |
| --- | --- | --- | --- | --- |
| C0 | 160 | 2.97 | 281 | 2.35 |
| C1 | 158 | 2.89 | 279 | 2.45 |
| C2 | 159 | 2.89 | 283 | 2.39 |
| C3 | 160 | 2.88 | 286 | 2.65 |
| C4 | 158 | 2.87 | 282 | 2.50 |

Several phase-change optical disks in the format of 2.6 GB DVD-RAM (Digital Versatile Disk-Random Access Memory) were made by using one of the B0, B1, C0 and C1 as composition of the recording layer. The optical disk had four layers deposited on a 0.6 mm PC substrate, and they were a lower dielectric layer of ZnS—$SiO_2$ (150 nm), the recording layer (20 nm), a upper dielectric layer of ZnS—$SiO_2$ (15 nm) and a reflective layer of Al (80 nm). Finally, another blank substrate was bonded to the deposited substrate to complete the fabrication of the optical disk. The recording-erasing characteristics were evaluated by a dynamic tester having an optical head with a laser wavelength of 638 nm and a numerical aperture (N.A.) of 0.6. The (8,16) modulation signal and mark edge recording method were used for carrier-to-noise ratio (CNR) measurement. The 3T mark length with frequency 4.87 MHz was set in recording at linear velocity of 6 m/s. DC erase on recorded marks of optimum write power was applied to measure the erase ratio (ER). The ER is defined as the difference in CNR between the recorded and erased signals.

Figure 11:
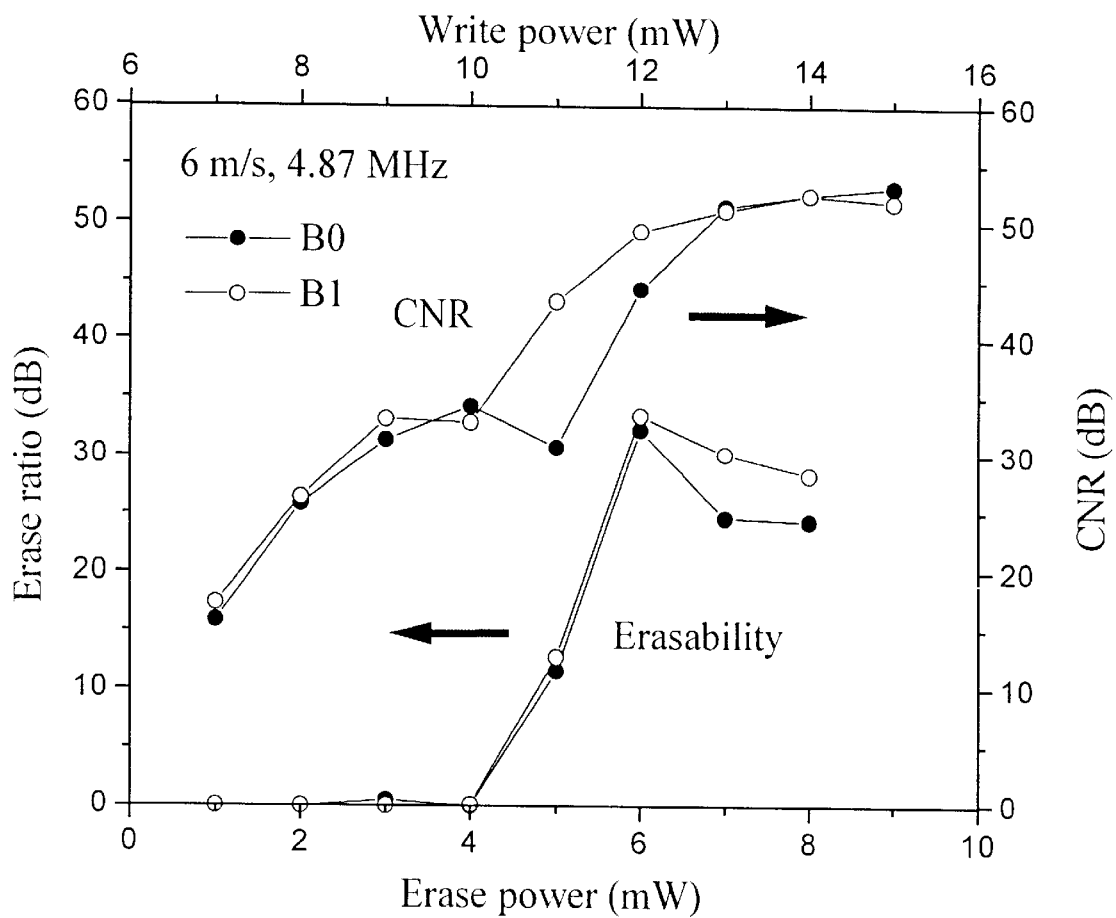
FIG. 11 is a plot showing dynamic erasing and writing characteristics of two phase-change optical disks prepared by using the compositions B0 and B1 in Example 1 of the present invention.

FIG. 11 shows the CNR and ER as functions of write power and erase power, respectively, of two phase-change optical disks prepared by using the compositions B0 and B1 in Example 1 as the recording layer. The optimal erasing power is 6 mW with ER of 32 and 33 dB for B0 and B1 recording layers, respectively. The optimal writing power is 14 mW with CNR of 54 dB for both B0 and B1 recording layers. The erasing and writing powers are almost the same for the recording layers with and without addition of boron, while the ER and CNR values increase slightly with the addition of boron. The cyclability test shows that the CNR's of B0 and B1 recording layers decrease to 48 and 49 dB, respectively, after $10^5$ cycles of writing and erasing, revealing that both recording layers have excellent overwriting performance.

Figure 12:
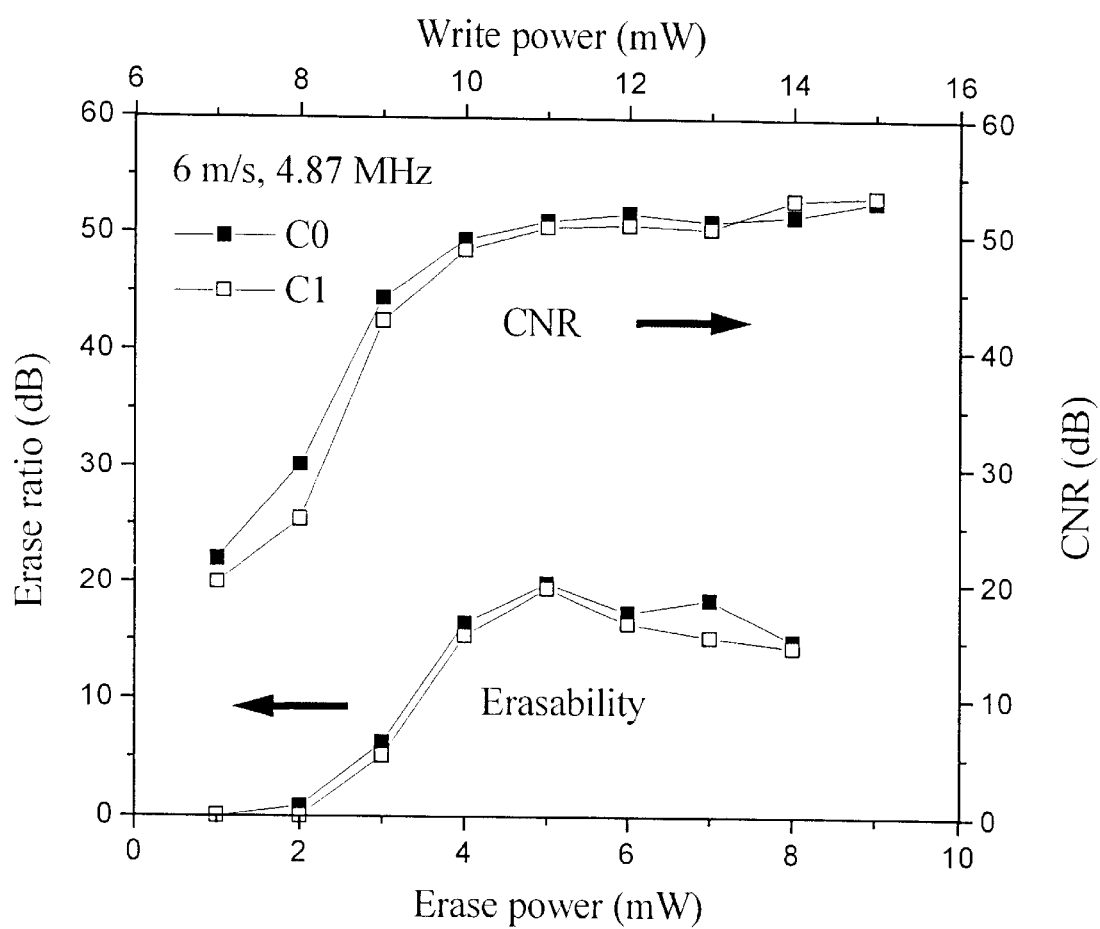
FIG. 12 is a plot showing dynamic erasing and writing characteristics of two phase-change optical disks prepared by using the compositions C0 and C1 in Example 2 of the present invention.

FIG. 12 shows the CNR and ER of two phase-change optical disks prepared by using the compositions C0 and C1 in Example 2 as the recording layer. The optimal erasing power is 5 mW with ER of 20 for both C0 and C1 recording layers. The optimal writing power is 12 mW with CNR of 52 and 51 dB for C0 and C1 recording layers, respectively. The erasing and writing powers are almost the same for the recording layers with and without addition of boron, while the ER and CNR values decrease slightly with the addition of boron. In comparison with the B0 and B1 recording layers, the C0 and C1 recording layers have lower erasing and writing powers, and a decrease of about 12 dB in ER. The cyclability test shows that both the CNR's of C0 and C1 recording layers decrease to about 48 dB, after $10^5$ cycles of writing and erasing, revealing that both recording layers have excellent overwriting performance.

In our further analysis of the designed alloys of the present invention, we found that:
 a) the amount of Ge is preferably higher than 12 at. % so as to have a sufficiently high melting point and a reasonable crystallization temperature;
 b) the sum of Bi and Sb amounts is preferably higher than 5 at. % so as to provide significant improvements in lowering the crystallization temperature and activation energy;
 c) the amount of Te is preferably within the range from 47 at. % to 60 at. % so as to avoid presence of undesired phases; and
 d) the amount of boron or carbon is preferably less than 4 at. % so as to avoid generation of boron compounds or carbon compounds.

Figure 13:
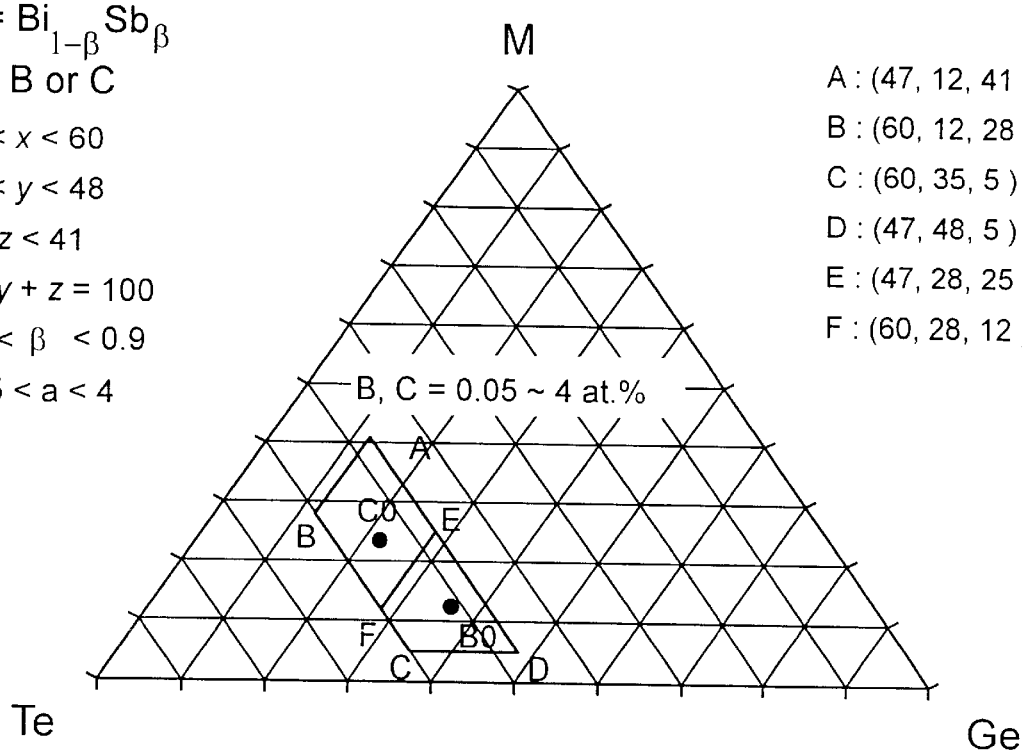
FIG. 13 is a composition diagram showing a preferred scope of the rewritable phase-change optical information recording composition according to the present invention, Te—(Ge,Bi,Sb)—X, wherein X=B or C, and X has 0.05~4 at. %.

Accordingly, a preferable five-element alloy of the present invention has a composition within an area encompassed by points A to D as shown in FIG. 13. Moreover, the preferable five-element alloy having a composition within the area ABCD is separated into two groups by a line EF, wherein the first group compositions enclosing the composition B0 will have properties close to the compositions B1 to B4 in Example 1, and the second group compositions enclosing the composition C0 will have properties close to the compositions C1 to C4 in Example 2.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. A rewritable phase-change optical information recording composition having a formula of $[Te_xGe_y(Bi_{1-\beta}Sb_\beta)_z]_{100-a}X_a$, wherein X is boron or carbon; x=47~60 atomic percentage (at. %); y=12~48 at. %; z =5~41 at. %, and x+y+z=100 at. %; β=0.1~0.9; and a=0.05~4 at. %.

2. The composition according to claim 1, wherein y=28~48 at. %, z=5~25 at. %, β=0.1~0.9, and a=0.5~3 at. %.

3. The composition according to claim 2, herein said composition has an optical contrast between its amorphous and crystalline states greater than 30% within a visible light range.

4. The composition according to claim 2, wherein said composition has a crystallization temperature ranging from 180 to 210° C.

5. The composition according to claim 2, wherein said composition only has face-centered cubic (FCC) phase in its crystalline state and at a temperature below 300° C.

6. The composition according to claim 2, wherein said composition has a crystallization activation energy ranging from 1.5 to 3.5 eV.

7. The composition according to claim 1, wherein y=12~28 at. %, z=12~41 at. %, β=0.1~0.9, and a=0.5~3 at. %.

8. The composition according to claim 7, wherein said composition has an optical contrast between its amorphous and crystalline states greater than 20% within a visible light range.

9. The composition according to claim 7, wherein said composition has a crystallization temperature ranging from 140 to 180° C.

10. The composition according to claim 7, wherein said composition only has face-centered cubic (FCC) phase in its crystalline state and at a temperature below 250° C.

11. The composition according to claim 7, wherein said composition has a crystallization activation energy ranging from 1.5 to 3.5 eV.

12. The composition according to claim 2, wherein said composition is $(Te_{50.6}Ge_{37.4}Bi_{5.7}Sb_{6.3})_{99.11}B_{0.89}$, $(Te_{50.6}Ge_{37.4}Bi_{5.7}Sb_{6.3})_{98.46}B_{1.54}$, $(Te_{50.6}Ge_{37.4}Bi_{5.7}Sb_{6.3})_{98.14}B_{1.86}$ or $(Te_{50.6}Ge_{37.4}Bi_{5.7}Sb_{6.3})_{99.01}C_{0.99}$.

13. The composition according to claim 7, wherein said composition is $(Te_{54.5}Ge_{22.0}Bi_{6.5}Sb_{17.0})_{99.26}B_{0.74}$, $(Te_{54.5}Ge_{22.0}Bi_{6.5}Sb_{17.0})_{98.73}B_{1.27}$, $(Te_{54.5}Ge_{22.0}Bi_{6.5}Sb_{17.0})_{98.15}B_{1.85}$ or $(Te_{54.5}Ge_{22.0}Bi_{6.5}Sb_{17.0})_{98.93}C_{1.07}$.

14. A rewritable phase-change optical disk comprising a substrate, and a rewritable phase-change optical information recording layer deposited on said substrate, wherein said rewritable phase-change optical information recording layer has a composition according to any one of claim 1.

15. A rewritable phase-change optical disk comprising a substrate, and a rewritable phase-change optical information recording layer deposited on said substrate, wherein said rewritable phase-change optical information recording layer has a composition according to any one of claim 2.

16. A rewritable phase-change optical disk comprising a substrate, and a rewritable phase-change optical information recording layer deposited on said substrate, wherein said rewritable phase-change optical information recording layer has a composition according to any one of claim 3.

17. A rewritable phase-change optical disk comprising a substrate, and a rewritable phase-change optical information recording layer deposited on said substrate, wherein said rewritable phase-change optical information recording layer has a composition according to any one of claim 4.

18. A rewritable phase-change optical disk comprising a substrate, and a rewritable phase-change optical information recording layer deposited on said substrate, wherein said rewritable phase-change optical information recording layer has a composition according to any one of claim 5.

19. A rewritable phase-change optical disk comprising a substrate, and a rewritable phase-change optical information recording layer deposited on said substrate, wherein said rewritable phase-change optical information recording layer has a composition according to any one of claim 6.

20. A rewritable phase-change optical disk comprising a substrate, and a rewritable phase-change optical information recording layer deposited on said substrate, wherein said rewritable phase-change optical information recording layer has a composition according to any one of claim 7.

21. A rewritable phase-change optical disk comprising a substrate, and a rewritable phase-change optical information recording layer deposited on said substrate, wherein said rewritable phase-change optical information recording layer has a composition according to any one of claim 8.

22. A rewritable phase-change optical disk comprising a substrate, and a rewritable phase-change optical information recording layer deposited on said substrate, wherein said rewritable phase-change optical information recording layer has a composition according to any one of claim 9.

23. A rewritable phase-change optical disk comprising a substrate, and a rewritable phase-change optical information recording layer deposited on said substrate, wherein said rewritable phase-change optical information recording layer has a composition according to any one of claim 10.

24. A rewritable phase-change optical disk comprising a substrate, and a rewritable phase-change optical information recording layer deposited on said substrate, wherein said rewritable phase-change optical information recording layer has a composition according to any one of claim 11.

25. A rewritable phase-change optical disk comprising a substrate, and a rewritable phase-change optical information recording layer deposited on said substrate, wherein said rewritable phase-change optical information recording layer has a composition according to any one of claim 12.

26. A rewritable phase-change optical disk comprising a substrate, and a rewritable phase-change optical information recording layer deposited on said substrate, wherein said rewritable phase-change optical information recording layer has a composition according to any one of claim 13.

* * * * *